Feb. 18, 1969
W. W. LOOSE
3,428,935
PROGRAMMING SYSTEM
Original Filed March 22, 1965
Sheet 1 of 4
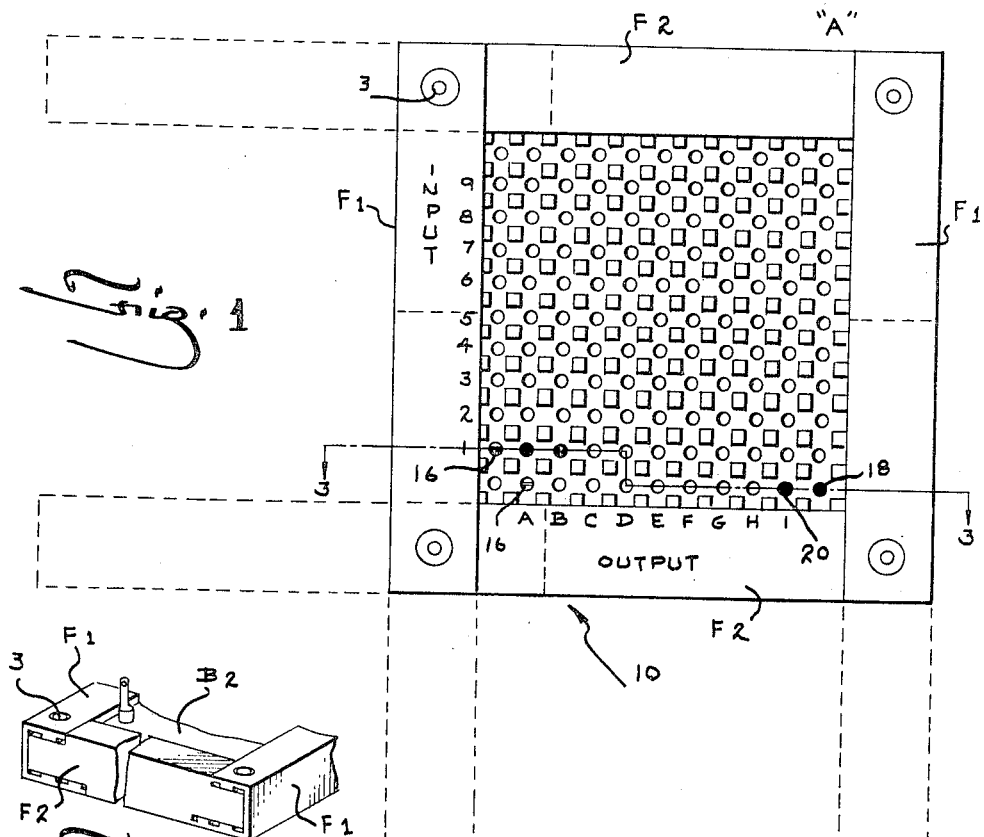
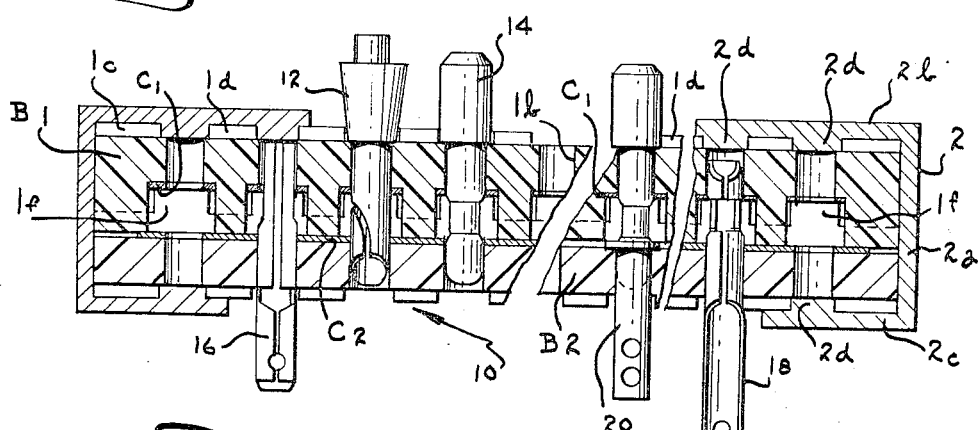
INVENTOR.
WINFIELD WARREN LOOSE
BY
John R Hopkins Feb. 18, 1969 W. W. LOOSE 3,428,935
PROGRAMMING SYSTEM
Original Filed March 22, 1965 Sheet 2 of 4

INVENTOR.
WINFIELD WARREN LOOSE
BY
John R Hopkins

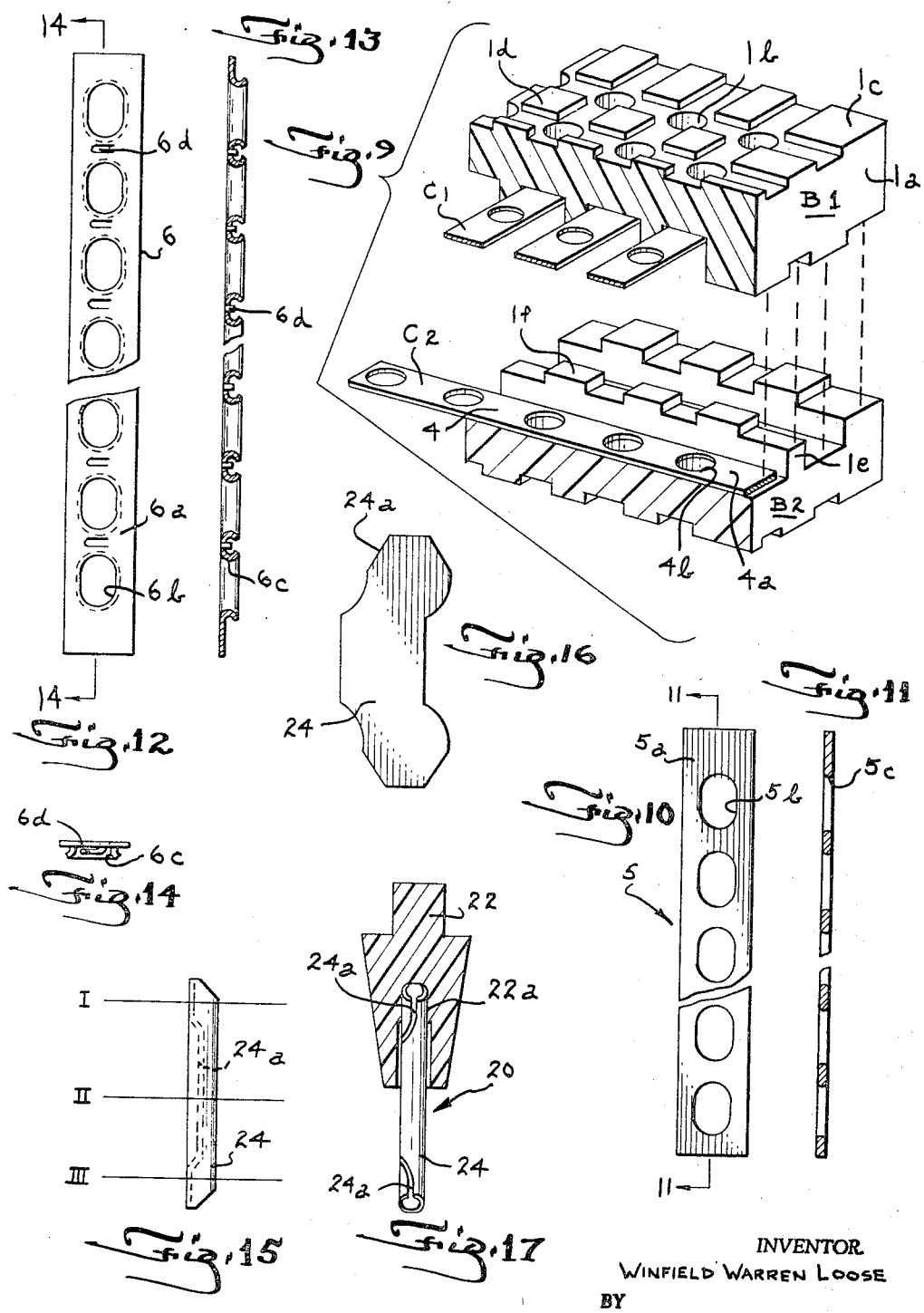

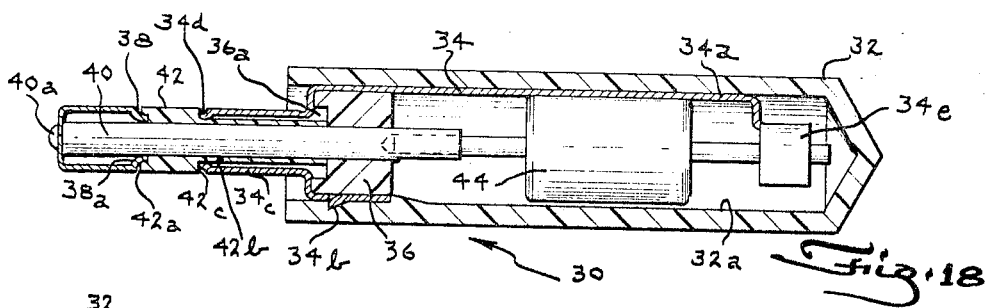
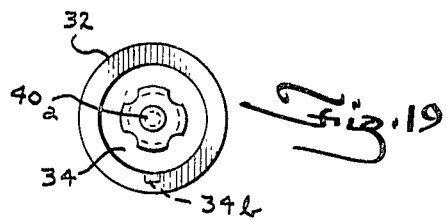
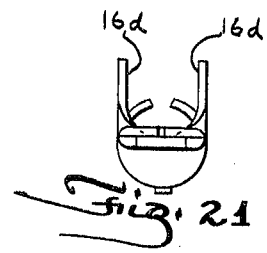
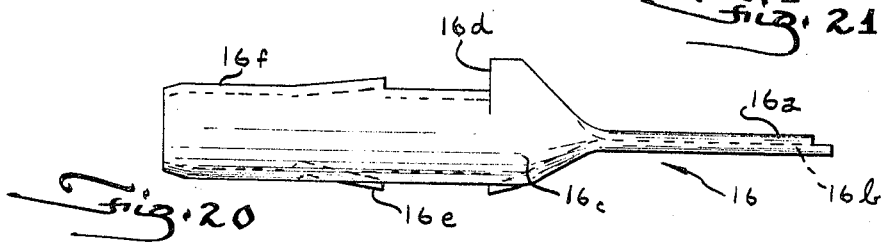
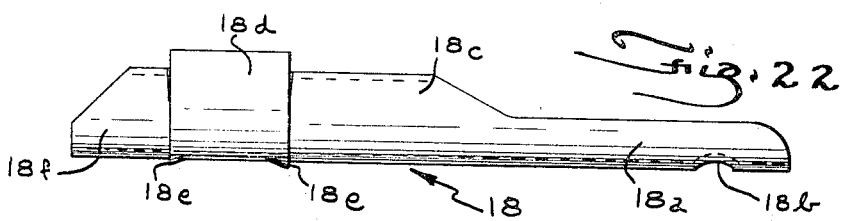
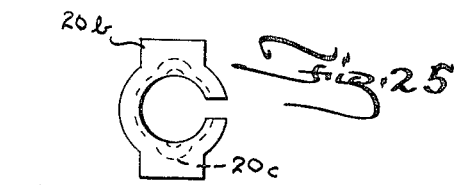
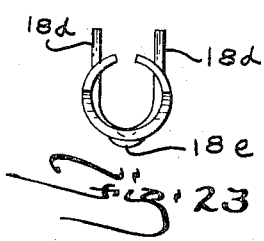
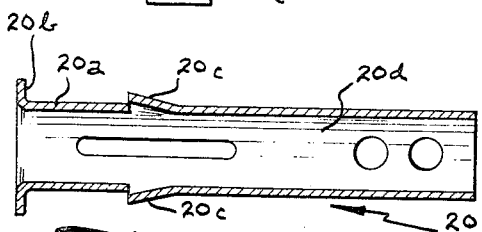

United States Patent Office 3,428,935
Patented Feb. 18, 1969

3,428,935
PROGRAMMING SYSTEM
Winfield Warren Loose, Reading, Pa., assignor to AMP Incorporated, Harrisburg, Pa.
Original application Mar. 22, 1965, Ser. No. 441,700. Divided and this application July 25, 1967, Ser. No. 669,329
U.S. Cl. 339—19            5 Claims
Int. Cl. H01r 31/08, 17/18, 11/22

ABSTRACT OF THE DISCLOSURE

A pin member for electrical pinboards is disclosed which features a one-piece stamping of sheet metal of tubular configuration having the seam thereof oriented in three different planes to provide a spring action which is independent in different length segments of the pin to facilitate a use in spaced, fixed wall contact strips. A diode pin version includes separate axially spaced spring portions insulated by a dielectric sleeve shaped to hold the ends of the spring portions against displacement interfering with pin insertion into spaced, fixed wall contact strips.

---

This invention relates to a programming system of the type utilized to selectively interconnect electrical circuit paths to control the function of electrical and/or electronic equipment.

U.S. Patents 3,027,534 and 3,085,220 show programming devices generically termed pinboards, and are here referenced to represent the prior art as it relates to the function of the present invention. U.S. Patents 2,437,018, 2,613,287 and 2,952,828 are referred to as representative of the prior are which relates to the function and to an extent to the structure of the present invention, which is submitted to be an improvement thereon.

One aspect of the present invention is to provide a programming system which has fewer parts and is simpler and cheaper to manufacture than prior art devices of an equivalent function. It is an object of the invention to accomplish this through a board structure which is smaller, lighter and stronger than the structures of the prior art. The system of the invention includes a contact structure which has, as its object, the provision of connections which are more reliable than the spring contact systems of the prior art, and have better electrical qualities than the fixed contact systems heretofore available.

A further aspect and object of the invention is to provide a novel programming pin which is simpler, cheaper and more reliable than spring-type pins heretofore available, and to provide a diode programming pin having a spring construction arranged to provide superior electrical contact characteristics.

It is a general object of the invention to provide a programming system, including a novel board and contact assembly in combination with shorting and diode programming pins for use therein.

The foregoing objects are attained in the present invention through the provision of a board comprised of two identical blocks, each carrying an array of flat strip contacts and each designed to intermate to lock sets of strip contacts within the assembly. The contact strips of the board are rigid or fixed. Shorting and diode pins are provided which are "live" or have spring characteristics; and, as an important aspect of the invention, the spring characteristics are divided into several axially-spaced spring sets relatively isolated from each other and yet joined together for use. As an aspect of the invention useful with a wide variety of terminal board constructions, the invention features a board configuration which is slightly curved as initially manufactured and then forced into a planar shape to develop residual stresses holding the combination of boards together and the springs therein against transverse movements within the boards.

In the drawings:

FIGURE 1 is a plan view of the bottom of the programming board assembly of the invention showing, in part, the board and frame construction contemplated;

FIGURE 2 is a perspective view of one end of the assembly of FIGURE 1;

FIGURE 3 is a section taken through lines 3—3 of FIGURE 1 showing the board and frame geometry in detail, and further showing, in elevation, the different pins and terminals utilized with the board;

FIGURE 9 is a perspective, partially-sectioned, of a corner of the board of the assembly shown in FIGURE 1, included particularly to depict the board orientation utilized to permit the same board to be employed in upper and lower halves of the assembly;

FIGURES 10 and 11 are plan and longitudinal section views, respectively, of the contact strip of the invention in one embodiment;

FIGURES 12, 13 and 14 are plan, longitudinal section and cross-section views of the contact strip of the invention in an alternative embodiment;

FIGURE 15 is an elevation of the shorting pin barrel preferred, and FIGURE 16 is a plan view of the barrel in the flat prior to forming;

FIGURE 17 is an elevation, partially sectioned, of the shorting terminal pin of the invention, including the barrel shown in FIGURES 15 and 16;

FIGURE 18 is a longitudinal section showing the construction of the diode terminal pin of the invention, and FIGURE 19 is an end-on view thereof; and FIGURES 20–21, 22–23, and 24–25 are plan and end-on views of three embodiments of input-output terminal pins in accordance with the invention.

Figure 4:
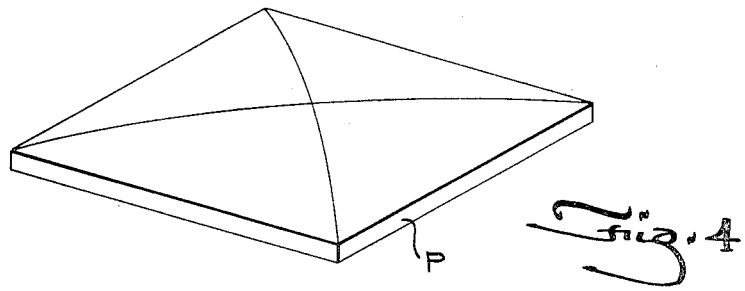
FIGURES 4–8 show, schematically through perspective and elevation, the construction of the board of the invention as related to its being bowed to develop residual stresses holding the assembly of FIGURE 1 together and the contacts thereof in place.

Referring now to FIGURES 1–3, a general description of the structure and function of the programming system of the invention will now be given. In its several aspects, the system includes a terminal board assembly 10 comprised of two apertured boards B1 and B2 of insulating material, four frame pieces comprised of two pairs of identical pieces F1 and F2, upper and lower contact strips C1 and C2 and a plurality of pins and terminals. The pins and terminals include a shorting pin 12, a diode pin 14, a terminal post 16 adapted to be engaged by a receptacle (not shown), a soldering terminal post 18 and a receptacle terminal 20. It is to be understood that in a typical application, only several of these terminals will normally be employed. For example, for the size board shown, which is a 9 x 9 matrix, the system might include eighteen terminal posts, such as 16, disposed in outside rows, and ten shorting pins, such as 12, placed in positions throughout the array of apertures in the board to program the device in accordance with the desired function. Alternatively, the system might include the board as shown with eighteen soldering posts 18, five shorting pins 12, and five diode pins 14.

The general arrangement of the system is such that inputs are applied to the contact strips through terminal posts disposed along two sides of the periphery of the array of apertures in the board on one side thereof, with programming pins being inserted in the appropriate positions from the other side. In FIGURE 3, the upper part of assembly 10 is the front face of the board and the lower part is the back or rear of the board. FIGURE 1 shows the board from the back, and FIGURE 2 shows the board with the rear faced upwardly. Along the left and bottom frame pieces F1 and F2, as shown in FIGURE 1, on the outer surfaces thereof and on both sides thereof, the input and output rows of apertures are labeled numerically and alphabetically. It will be understood that the front face of the board is reversed from that shown in FIGURE 1, such that the upper left-hand aperture would coordinate 1–A relative to the insertion of a programming pin. With an input lead attached to the terminal post 16 in row 1 and an output lead attached to terminal post 16 in column A, insertion of a programming pin 12 in the aperture at 1–A will result in the completion of an electrical path from the input lead through the contact strips and the barrel portion of the programming pin to the output lead. In similar manner, other completed paths may be selected by the insertion of pins in the various alpha-numeric positions disposed in the array of apertures in the board.

In certain uses it may be desirable to provide the assembly 10 with only one level of contact strips, each terminated to an input with an array of terminal receptacles 20 disposed, as indicated in the drawings, such that the insertion of a pin 12 will establish a connection from the associated strip to an output lead via the pin through the receptacle.

The foregoing examples of uses of the system of the invention can, of course, be readily expanded by those skilled in the art to cover the wide variety of applications calling for programming functions through the use of coordinate matrix-type connectors, patchboards, or pinboards.

Turning now to a detailed description of the invention in its several aspects, and referring first to the board and its structure, reference is again made to FIGURES 1–3 and further to FIGURE 9. The board assembly is comprised of but two board members B1 and B2 which, in accordance with the invention, are identical such that they may be manufactured from the same mold, or at least duplicated if machined or otherwise processed. The interior configuration of each board can be seen from FIGURES 3 and 9 to include a body 1a which is preferably a one-piece integral structure of insulating and/or dielectric material having a series of apertures 1b disposed in matrix array transverse to the major plane of the body and extending therethrough.

On either side of the board body are provided a series of rectangular or square projections of various lengths. The projections on the outer surface of the body are shown as 1c and 1d, and are made to be of a relatively limited height for the purpose of engaging the frame members F1 and F2 in the manner indicated best in FIGURE 3. It is contemplated that the inner projections 1d may be, in certain instances, left off of the body since the frame members need engage only the outer projections in the embodiment herein shown. For general utility, however, and for reasons to become apparent hereinafter, providing projections 1d throughout the upper face of the board is considered to be desirable. First of all, the board body, as shown, may be cut into smaller sizes with the projections being utilized to accommodate similar frame members. Secondly, the existence of the projections aids in identifying the positions of the apertures for pin insertion. In this regard, it may be found desirable to color the surfaces of the projections of 1d, as by silk-screening or the like.

The interior of each board includes rows of continuous projections 1e with a series of integral further projections 1f on each row. The spacing between the projections 1f is such as to accommodate contact strips which are extended across the board in grooves between projections 1e. The projections 1e and 1f are dimensioned and positioned such that when one body containing its contact strips is rotated 90° relative to the other body member, the two body members may be forced together with the projections 1e and 1f thereof inter-digitating to hold the contact strips in position. Referring to FIGURES 3 and 9, it will be seen that the projections 1e hold the contact strips against movement in a direction transverse to the length of the strips, and the projections 1f extend to hold the contact strips against movement in a direction transverse to the plane of the strips. With the boards B1 and B2 held together, the contact strips C1 and C2 are thus locked in place and yet held out of contact with each other.

Figure 5:
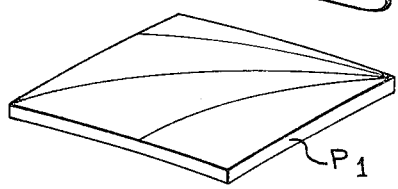
Figure 6:
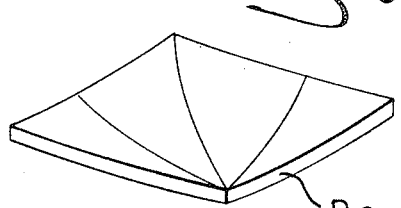
Figure 7:
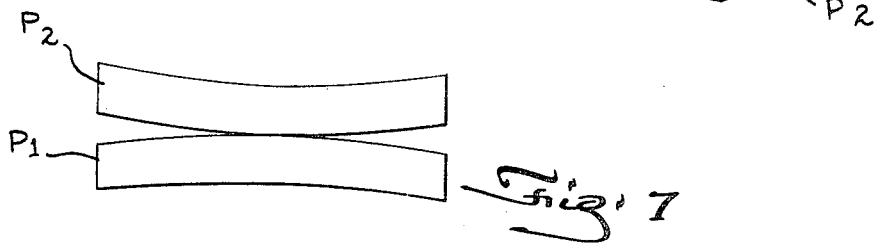
Figure 8:
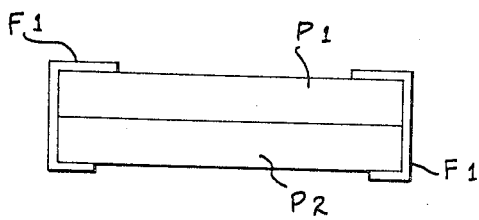

Referring now to FIGURES 4–8, a further aspect will be described which operates to better assure the locking of the contact strips into place and to preclude any looseness toward the center of the boards which might permit the strips to move out of alignment. In FIGURES 4–8, the panel P is not shown to contain the projections and apertures heretofore described with respect to board members B1 and B2, but such features may be considered as included. Considering P to be approximately four times the area the size of boards B1 and B2, two complete board assemblies may be made up by cutting the panel into four equal squares. As one aspect of the invention, the panel P represents a molded piece which is molded in the flat and then deformed during cooling to have a very slight bow in the manner indicated by the solid lines in FIGURE 4. In practice, the bowing may be accomplished by supporting a freshly-molded panel horizontally along its edges with the center unsupported and with a small weight placed on the top surface thereof. A stop disposed below the center will control the displacement to a desired value while the panel cools. With P bowed, as indicated in FIGURE 4, and cooled to take a permanent set in this shape, the sections P1 and P2, cut out as indicated in FIGURES 5 and 6, will also have some degree of curvature. In an actual panel having a size approximately seven inches square, the bow at the center thereof was made to be approximately $\frac{1}{32}$ of an inch. During assembly, the sections P1 and P2 are oriented relative to each other, as indicated in FIGURES 5 and 6, to provide alignment for intermating as heretofore described, and then are positioned in the manner indicated in FIGURE 7 such that the faces of the sections have their concave surfaces outwardly and their convex surfaces inwardly. In this position the application of frame members, such as F1 and F2 heretofore described, will result in the sections being forced into a flattened configuration as indicated in FIGURE 8. This serves to develop a residual stress in the panels tending to hold the centers thereof in engagement, and further tending to hold the outer edges thereof better in engagement with the frame members. The residual stress which is developed toward the centers of the boards also serves to contain the contact strips by holding the projections of the board against outward displacement. If the boards were molded in the flat or left to some production tolerance which would permit a slight inward bow reverse to that shown, slight transverse spaces between the surfaces of the projections would result and the contact strips could float within the assembly. Similar effects, due to humidity, are also resisted through the foregoing construction of the board assembly of the invention. It is contemplated that this aspect of the invention may be employed in any lamina assembly of boards or panels, and particularly in any such assembly wherein loose-piece contact strips are contained between laminations.

It is contemplated that an additional flat board may be added to the assembly for apertured identification or strength, but such is usually not necessary. Referring back now to FIGURES 1–3 and to the frame members F1 and F2, it is contemplated that these members may be of extruded stock, of either metallic or insulating material, cut to the lengths shown or to other suitable lengths or other sizes. The frames includes a body 2 having an outer wall section 2a, and sidewall sections 2b and 2c which project from the wall section 2a to form a U-shaped channel. In a preferred embodiment, the wall section 2b is made to be wider than the wall section 2c so as to cover over an extra row of apertures in the upper board member. This serves to define the front and rear surfaces of the assembly and to preclude the insertion of programming pins in apertures normally utilized for terminal posts disposed about the periphery of the array of apertures of the board. On the inside surface of wall portion 2b are parallel projections 2d extending along the length of the body which engage the spaces defined between the projections 1d and lock the frame against outward movement relative to the board. At the corners of the assembly 10, holes are drilled in the frame members for the installation of screws, rivets or the like, to lock the assembly together or to lock the assembly to an equipment panel. This is represented by 3 in FIGURES 1 and 2.

Turning now to details of the contact strip of the invention, reference is made to FIGURE 3 and to FIGURES 9–14. The strip configuration, shown as 4 in FIGURE 9, represents the simplest embodiment contemplated, in that the body 4a includes substantially circular holes 4b spaced along the length in positions aligned with the apertures 1b of the upper and lower board members. The holes 4b are made to be slightly smaller than the apertures 1b, and the strip 4 is of a width to fit rather exactly in the groove between projections 1e. The length of the strip is tailored to leave the ends thereof out of engagement with the frame members if such are of metallic construction.

The strip, shown as 5 in FIGURES 10 and 11, includes a body 5a which, in length and width, is substantially like that of 4. The difference is that the strip holes 5b are made oblong, with the dimension of maximum length lying along the longitudinal axis of the strip. Holes 5b are radiused about each edge, as at 5c in FIGURE 11, and include sidewalls substantially parallel and spaced apart by dimension slightly less than the relaxed dimension of the programming pin utilized in the system. By providing holes in the oblong shape, production and assembly tolerances are eased since any slight displacement of the strip along its length is accommodated without interfering with the insertion of a pin. Of equal importance is an accommodation of any slight deviation in the center-to-center spacing of the holes. The radius, as at 5c, prevents scoring or scraping of the programming pin during insertion and withdrawal.

In FIGURES 12, 13 and 14, a further embodiment of the strip is shown, which is similar in plan to that of the embodiment of FIGURES 10 and 11, to include a body 6a and spaced, oblong holes 6b. The holes 6b are radiused by a forming of the metal to develop an eyelet structure, as shown in FIGURE 13. As a further point, between each hole is a tab 6d struck out as indicated to extend below the plane of the strip. The tabs 6d are engaged by the projections 1f of the upper and lower board members to better hold the strips within the board member slots and thus further relieve tolerances. The feature represented by the tabs prevents slight transverse movement of the strips during pin insertion and withdrawal throughout the area of the board members, and the features may be utilized in lieu of the bowing of the boards heretofore described or in conjunction therewith.

The various strip embodiments each have their particular advantage in accordance with the practice of the invention. For example, the strip 4 is preferred in uses wherein the programming pin employed does not have a generally cylindrical terminal configuration. The embodiment, shown as 5, is preferred where it is desirable to have relatively thick, heavy metal stock which must be coined to provide the radiused edge 5c and cannot be formed as in the embodiment of FIGURES 12–14. The embodiment 6 is preferred wherein the metal stock is relatively thin and may be easily formed.

Turning now to the aspect of the invention as it relates to various programming pins, reference is made to FIGURES 15–19. The shorting pin 20 is comprised of a plastic handle 22 and a contact barrel 24 having spring characteristics. The handle 22 includes a bore 22a which is of a cross-sectional dimension less than the relaxed cross-sectional dimension of the end of the barrel 24 and of a depth to provide sufficient bearing area to hold 24. A further bore 22b is provided which is of a diameter approximately equal to the relaxed diameter of 24. In use, it is preferred to have the handle 22 separately molded with the barrel 24 being compressed and inserted within board 22a, to be held therein by the residual spring force developed in the upper end of the barrel. While not shown, it is contemplated that barbs or tabs may be struck outwardly from the upper end of 24 to engage a recess formed in the bore 22a to better improve holding characteristics. The programming pin barrel 24 is rolled from the stamping shown in FIGURE 17 to form a "live" pin structure with three, relatively-isolated, radial spring systems indicated in FIGURE 15 as operating in planes I, II, III. The spring acting in plane I is, as described, adapted to lock the pin barrel to the pin handle. The spring acting in the plane II is adapted to operate to effect contact with the upper contact strip C1, as shown in FIGURE 3, through an engagement with the holes of the contact strip. The end of the barrel 24 is a separate spring system operating radially in the plane III to fit within and be compressed by the holes in the lower contact strips C2. The various spring systems in the planes I, II and III are isolated by reason of the disposition of the seam, show as 24a, which is made to extend along and around the length of the member 24 to position the material edges so as to close as the pin is compressed normally relative to any two adjacent zones. This means that the outer end of the pin 24 may be compressed without also compressing portions of the pin in plane 11. This also means that portion of pin in plane II may be compressed without compressing portions in planes I and III. Because of this, the pin of the invention may be utilized with the fixed contact represented by contact strips C1 and C2.

While the embodiment shown is preferred, it is contemplated that other configurations may be formed which will provide at least two isolated spring portions in a terminal pin.

Referring now to FIGURES 18 and 19, the diode programming pin aspect of the invention is shown in an assembly 30 to include an insulating handle 32, a pair of contact members 34 and 38, a pair of insulating inserts 36 and 42, a shaft 40 and a diode 44. The handle 32 has an interior bore 32a adapted to be engaged along its length by an arm 34a of the contact member 34, and to be locked to 34 by an outwardly-directed tang 34b which engages the material of the handle. The diameter of the bore 32a is the region of portion 36 is made slightly smaller than the diameter of the contact member so as to develop a spring reserve directed outwardly to hold the member in the handle against axial pull-out. This feature is disclosed more fully in co-pending application, Ser. No. 431,555, filed Feb. 10, 1965.

Member 34 includes a forward resilient portion 34c comprised of spring finger members which extend in the general direction of the axis of the diode pin assembly, and are suitably relieved relative to 42 to define a radial spring action. The outer ends of 34 are turned down, as at 34d, to avoid engagement with the contact strip. The forward contact member 38 is also comprised of finger members which are relieved to provide a radial spring action, and members 34 and 38 are spaced apart by the distance sufficient to provide isolation therebetween when inserted in the board member and to engage the upper and lower contact strips C1 and C2 of the system as heretofore generally described. Spring member 38 is secured to a central shaft 40 which extends longitudinally of the pin assembly back within the bore of the handle to be terminated to one lead of the diode 44, the other lead being terminated to 34 at the portion 34c in the manner indicated. The ends 38a of the contact member 38 are folded inwardly to rest against the outside surface of shaft 40 beneath an outer flange 42a of the insert 42 which holds the ends against outward displacement. The insert 42 includes further a reduced diameter sleeve portion 42b defining a step shown as 42c, which is disposed proximate the ends of the contact spring fingers of 34c. The inner end of 42 is fitted within an inner recess or relief 36a to provide a continuous insulation of shaft 40 within 34. Insert 36 is of an outer diameter to support shaft 40 against radial displacement relative to 34. The contact member 38 is staked, or otherwise fastened, to the end of shaft 40 by a rivet or by an extension on the end of 40 of reduced diameter peened over the end face of 38 as at 40a.

For use with a constact strip having round holes, it is possible to provide members 34 and 38 with only two spring fingers. With oblong holes, at least three fingers are required and four are preferred. Insertion of 30 within the assembly 10 in the manner of FIGURE 3 will connect a diode between the paths represented by intersecting strips C1 and C2.

Turning to a description of the various terminal posts, FIGURES 20–21 show the terminal post configuration preferred for use with input and output leads which carry receptacles adapted to be plugged onto the posts. FIGURE 3 shows this post as 16 mounted in the board assembly. From FIGURES 20 and 21, it will be apparent that the post 16 is of one piece to include a contact portion 16a formed of a tubular member folded and flattened for rigidity. An aperture 16b is provided at the outer end adapted to engage the dimple of a suitable receptacle. Post 16 further includes a flared-out portion 16c having a pair of upstanding ears 16d sloped on the forward side in the manner indicated, and defining a vertical face on the rear side which engage the lower surface of the board in which the post is mounted. The remainder of the post body is generally cylindrical, as indicated in FIGURE 21, to project upwardly and to be supported in the apertures of the board members, and is made to contain an open seam so that the member is resilient to be compressed in such apertures and held rigidly in the board. Near the center of the post is an outwardly-directed spring member shown as 16f, which is positioned to be forced inwardly upon axial insertion of the post to snap outwardly and engage an upper surface of the lower board member and lock the post in position against axial withdrawal outwardly. In use, the post 16 engages one or the other of the upper and lower contact strips as shown in FIGURE 3.

In FIGURES 22 and 23, there is included an alternative terminal post 18 shown as secured in the board (FIGURE 3). This embodiment includes a projection 18a, apertured as at 18b to receive conductive strands of a lead to be soldered thereto and rounded in a portion 18c to a dimension to fit within an aperture and contact strip hole in the lower board member. Adjacent 18c is an outward projection including a pair of upstanding ears 18d flared outwardly and rounded as at 18e. The length of 18d and the actual spacing of the projections of 18e is such as to fit within and between the upper and lower board members and to be locked therein against axial displacement. The upper end of the post defines a portion 18f which is rounded and split to provide resilient characteristics such that the post may engage the upper contact strip. The portion 18c is also split to provide resilient characteristics so that it may alternatively be utilized to engage the lower contact strip. The post 18 is mounted as indicated in FIGURE 3.

FIGURES 24 and 25 show alternative versions of the terminal post of the invention, 20, having an upper cylindrical split portion 20a which includes a flange 20b adapted to fit over the upper surface of the lower board in a groove between projections 1f therein. Projections 20c are provided on either side of the post to engage the lower surface of the lower board and, in conjunction with the flanges 20b, lock the post within the assembly against axial displacement. The contact portion 20d extends outwardly from the board to be terminated to an input or output lead in a suitable manner. In use, the post 20 operates as a receptacle such that when a pin is plugged into the board, it enters the post and a connection is made from an upper contact strip to the post and then to an associated lead.

The system of the invention, having been described in a manner intended to teach a preferred mode of practice, is now defined through the appended claims.

What is claimed is:

1. A shorting pin for pinboards of the type having spaced contact strips comprised of a single piece of metal stock rolled into a cylindrical configuration, an end portion secured in an insulating handle and a further resilient portion including two axially-spaced contact zones, the said resilient portion including a continuous seam providing a spacing between edge surfaces to permit said further portion to be compressed, said seam extending axially along said portion and then spiraling to a point ninety degrees around said portion and then axially to provide a separation of spring action in two parts of said portion.

2. A pin member comprised of a single piece of conductive sheet material of tubular configuration including a first seam extending axially to define a first resilient portion, a second seam extending axially to define a second resilient portion, the said second seam being disposed in a plane substantially normal to a plane containing the first seam, the said first and second portions forming contact areas for said member isolated by the displacement of said seams, a third seam defining a third resilient portion, the third seam being disposed in a plane substantially normal to the plane of the first seam, isolating said third portion from said first portion, and a further seam extending between the first and second seams and between the second and third seams to provide a continuous seam extending along said member.

3. A pin member comprised of a single piece of conductive sheet material of tubular configuration including a first seam extending axially to define a first resilient portion, a second seam extending axially to define a second resilient portion, the said second seam being disposed in a plane substantially normal to a plane containing the first seam, the said first and second portions forming contact areas for said member isolated by the displacement of said seams, a third seam defining a third resilient portion, the third seam being disposed in a plane substantially normal to the plane of the first seam, isolating said third portion from said first portion, said third portion being compressed within the core of an insulating handle.

4. A diode pin for pinboards of the type having spaced contact strips, including a contact barrel comprised of a center rigid rod member surrounded by an insulating insert having a forward sleeve portion with an internal recess in the outer end and a further sleeve portion of lesser diameter, a first contact member secured to said rod member having at least one resilient contact arm extending back along said rod with the end thereof disposed in said insert recess, a second contact member having at least one resilient contact arm extending over said further sleeve with the end thereof turned inwardly to rest against the further sleeve outer surface, said second contact member including a further portion of larger diameter extending rearwardly and terminated to one lead of a diode, the other lead of the diode being terminated to the said rod member and an insulating shroud fitted over and secured to said further portion of said second contact member.

5. The pin of claim 4 wherein said contact members include at least three resilient arms positioned to effect an engagement with a non-circular opening in a contact strip.

(References on following page)

References Cited

UNITED STATES PATENTS

| | | | |
|---|---|---|---|
| 1,769,967 | 8/1930 | Saurman et al. | 174—22 |
| 1,871,839 | 8/1932 | Carter | 339—270 |
| 3,145,329 | 8/1964 | Deakin et al. | 339—183 XR |
| 3,183,299 | 5/1965 | Johnston et al. | |
| 3,208,029 | 9/1965 | Leslie. | |
| 3,312,930 | 4/1967 | Hatfield et al. | |

FOREIGN PATENTS

| | | |
|---|---|---|
| 70,102 | 10/1958 | France. |
| | (Addition to 70,102) | |
| 104,876 | 5/1924 | Switzerland. |

MARVIN A. CHAMPION, *Primary Examiner.*

P. A. CLIFFORD, *Assistant Examiner.*

U.S. Cl. X.R.

339—147, 183, 252